US006883349B1

(12) United States Patent
Jeanvoine

(10) Patent No.: US 6,883,349 B1
(45) Date of Patent: Apr. 26, 2005

(54) METHOD FOR PREPARING RAW MATERIALS FOR GLASS-MAKING

(75) Inventor: Pierre Jeanvoine, Poissy (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/646,880

(22) PCT Filed: Feb. 2, 2000

(86) PCT No.: PCT/FR00/00239

§ 371 (c)(1),
(2), (4) Date: Jan. 26, 2001

(87) PCT Pub. No.: WO00/46161

PCT Pub. Date: Aug. 10, 2000

(30) Foreign Application Priority Data

Feb. 5, 1999 (FR) ............................................. 99 01406
Dec. 22, 1999 (FR) ............................................. 99 16297

(51) Int. Cl.$^7$ ............................................. C01B 33/32
(52) U.S. Cl. ...................... 65/134.3; 65/17.2; 65/134.5; 423/326; 423/331; 423/332; 423/334
(58) Field of Search ............................. 65/134.5, 134.8, 65/135.2, 135.7, 135.6, 335, 17.2, 134.3; 423/326, 331, 332, 334; 110/252, 258; 588/11, 206, 238, 245, 248

(56) References Cited

U.S. PATENT DOCUMENTS

| 2,154,439 | A | * | 4/1939 | Cornelius |
| 2,211,733 | A | | 8/1940 | Soderberg |
| 2,243,027 | A | | 5/1941 | Baker |

(Continued)

FOREIGN PATENT DOCUMENTS

| EP | 0 812 809 | 12/1997 |
| FR | 1 211 098 | 3/1960 |
| FR | 1 469 109 | 2/1967 |
| FR | 2 774 085 | 7/1999 |
| GB | 1 527 155 | 10/1978 |
| HU | 212 280 B | 4/1996 |
| HU | 217 662 B | 3/2000 |
| RU | 1659363 | 6/1991 |
| WO | WO 99/35099 | * 7/1999 |
| WO | WO 99/37591 | 7/1999 |

OTHER PUBLICATIONS

I. M. Kitajgorodsky, pp. 84, 94, 95, 235, 307, 308, 313, 325 and 335, "Glass Technology", 1961.
M. I. Kozmin, et al., Science in the Glass Industry, No. 9, XP-002099792, pp. 13–14, "An Experimental Furnace with Gas Combustion in the Melt and Thin–Layer Fining", Sep. 1974 (with English translation).
M. I. Kozmin et al.: "An Experimantal Furnace With Gas Combustion in the Melt and Thin–Layer Fining"; Science in the Glass Industry: XP–002099792; No. 9, pp. 623–625, Sep. 1974.

(Continued)

*Primary Examiner*—Sean Vincent
(74) *Attorney, Agent, or Firm*—Oblon, Spivak, McClelland, Maier & Neustadt, P.C.

(57) ABSTRACT

The subject of the invention is a process for manufacturing compounds based on one or more silicates of alkali metals, such as Na and K and/or alkaline earth metals such as Ca, Mg, and/or on rare earths, such as Ce, optionally in the form of mixed silicates which combine alkaline-earth metals, such as Ca, with the alkali metal(s) and the rare earth(s), by conversion of silica and of halides, especially of one or more chlorides, or sulfate or nitrate, of the said alkali metals and/or of the said rare earths and/or of the said alkaline-earth metals, such as NaCl, KCl or $CeCl_4$. The heat needed for the conversion is supplied, at least partly, by one or more submerged burners.

Figure 1:
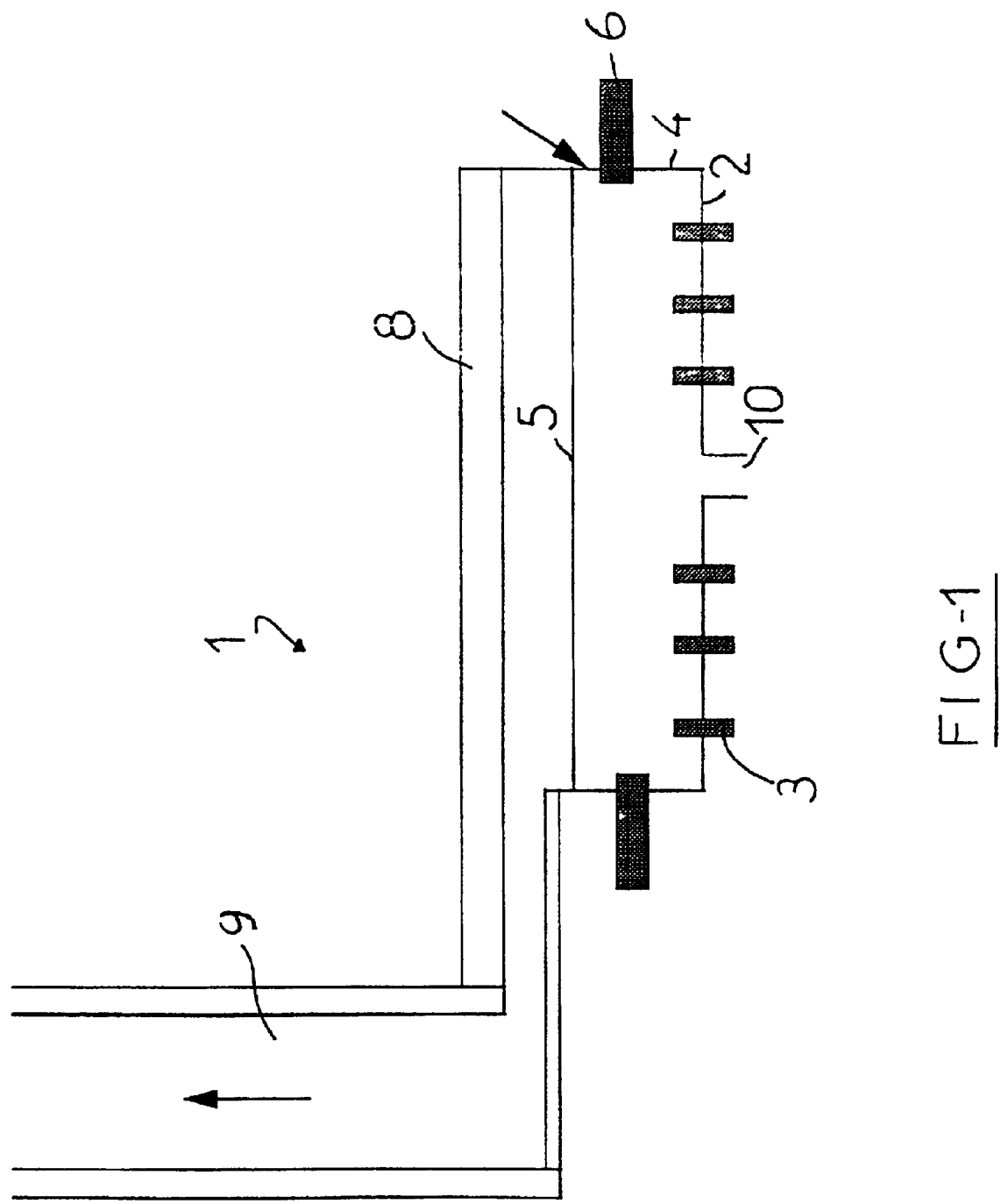

The subject of the invention is also an apparatus for carrying out the process and for its use.

39 Claims, 1 Drawing Sheet

U.S. PATENT DOCUMENTS

| | | | |
|---|---|---|---|
| 3,241,548 A | | 3/1966 | See et al. |
| 3,248,205 A | | 4/1966 | Dolf et al. |
| 3,260,587 A | | 7/1966 | Dolf et al. |
| 3,268,789 A | | 8/1966 | Henry et al. |
| 3,466,021 A | * | 9/1969 | Van Weert et al. |
| 3,606,825 A | | 9/1971 | Johnson |
| 3,627,504 A | | 12/1971 | Johnson et al. |
| 3,907,674 A | * | 9/1975 | Roberts et al. |
| 3,960,532 A | | 6/1976 | Lazet |
| 4,029,514 A | | 6/1977 | Lange |
| 4,045,197 A | | 8/1977 | Tsai et al. |
| 4,047,669 A | | 9/1977 | Gutai |
| 4,203,761 A | | 5/1980 | Rose |
| 4,285,718 A | | 8/1981 | Mathias et al. |
| 4,288,251 A | * | 9/1981 | Haga et al. |
| 4,336,235 A | | 6/1982 | Deabriges |
| 4,481,024 A | | 11/1984 | Bly |
| 4,539,034 A | | 9/1985 | Hanneken |
| 4,545,800 A | | 10/1985 | Won et al. |
| 4,581,217 A | | 4/1986 | Shinpo et al. |
| 4,756,903 A | | 7/1988 | Shinpo et al. |
| 5,250,488 A | | 10/1993 | Thelohan et al. |
| 5,282,881 A | | 2/1994 | Baldock et al. |
| 5,308,043 A | | 5/1994 | Floyd et al. |
| 5,340,559 A | * | 8/1994 | Delwel et al. |
| 5,344,633 A | | 9/1994 | Sorensson et al. |
| 5,614,449 A | | 3/1997 | Jensen |
| 5,785,940 A | * | 7/1998 | Carroll et al. |
| 5,922,097 A | | 7/1999 | Kobayashi et al. |
| 6,460,376 B1 | | 10/2002 | Jeanvoine et al. |
| 2002/0162358 A1 | | 11/2002 | Jeanvoine et al. |

OTHER PUBLICATIONS

J.R. Carroll et al.; "The Submerged–Combustion Technique for High–Temperature Melting", AIChE Prepring 16, Aug. 3–6, 1969.

Laurel M. Sheppard; "Progress Continues in Glass Melting Technologies"; Ceramic Industry; Jan. 1996, pp. 26–30.

The Ausmelt TSL Process; "Introducing a Cleaner, Less Expensive Way to Recover and Recycle Metal and Inorganic Wastes"; 1995 (no month available).

V.V. Vargin; "Manufacturing of Colored Glass"; Moscow, Gos. Izd–vo Legkoj Promyshlennosti, Leningrad, 1940, pp. 205, 220, 209; (with partial English translation) (no month available).

"Tekhnlogija stekla" / "Glass Technology", edited by I.I. Kitajgorodskij, Moscow,, "Gosstroyizdal" Publishing House, 1961, p. 84 (English Translation Attached).

N. L. Glinka, General Chemistry, "131. Production and use of Sulfuric Acid", pp. 376–379, 1984.

* cited by examiner

METHOD FOR PREPARING RAW MATERIALS FOR GLASS-MAKING

This application is a 371 of PCT/FR00/00091, filed Jan. 18, 2000, to which priority is claimed. This application further claims priority to French patent applications 99/01406 and 99/16297 filed Feb. 5, 1999, and Dec. 22, 1999, respectively.

The invention relates to a process for preparing certain materials that can be used for manufacturing glass.

In the context of the present invention, "batch materials" should be understood to mean all materials, vitrifiable materials, natural ores or synthesized products, materials coming from recycling of the cutlet type, etc. which can be used in the composition for feeding a glass furnace. Likewise, "glass" should be understood to mean glass in the widest sense, that is to say any glassy-matrix, glass-ceramic or ceramic material. The term "manufacture" should be understood to mean the indispensable step of melting the batch materials and possibly all the subsequent/complementary steps aimed at refining/conditioning the molten glass for the purpose of giving it a final shape, especially in the form of flat glass (glazing), hollowware (flasks and bottles), glass in the form of mineral wool, (glass wool or rock wool) used for its thermal or acoustic insulation properties, or possibly even glass in the form of so-called textile yarns used in reinforcement.

The invention relates most particularly to the batch materials needed for manufacturing glass having a significant content of alkali metals, especially sodium, for example glasses of the silica-soda-lime type used for the manufacture of flat glass. The batch material most frequently used at the present time for providing sodium is sodium carbonate $Na_2CO_3$, a choice which is not without drawbacks. This is because, on the one hand, this compound provides only sodium as constituent element of the glass, all the carbon-containing part decomposing and given off in the form of $CO_2$ during melting. On the other hand, it is an expensive batch material compared with others since it is a synthetic product obtained by the Solvay process from sodium chloride and lime, which process involves a number of manufacturing steps and is not very energy-saving.

This is the reason why various solutions have already been proposed for using, as a sodium source, not a carbonate but a silicate, possibly in the form of a mixed silicate of alkali metals (Na) and alkaline-earth metals (Ca) which is prepared beforehand. The use of this type of intermediate product has the advantage of providing jointly several of the constituents of the glass and of eliminating the decarbonization phase. It also makes it possible to speed up the melting of the batch materials as a whole and to favour their homogenization during melting, as indicated, for example, in Patents FR-1,211,098 and FR-1,469,109 However, this approach poses the problem of manufacturing this silicate and does not propose a completely satisfactory method of synthesis.

The object of the invention is therefore to develop a novel process for manufacturing this type of silicate, which is especially suitable for providing industrial production with a reliability, an efficiency and a cost which are all acceptable.

The subject of the invention is firstly a process for manufacturing compounds based on silicates of alkali metals such as Na, K and/or based on alkaline earth metals such as Mg or Ca and/or based on rare earths such as cerium Ce, optionally in the form of mixed silicates which combine at least two elements among alkali metals, alkaline-earth metals and rare earths, notably silicates which combine alkali metals with the alkaline-earth metals and/or the rare earths. This process consists in synthesizing these compounds by the conversion of silica and of one or more halides (especially chlorides), of the said alkali metals and/or of the said alkaline-earth metals and/or the said rare earths, of the NaCl, KCl or $CeCl_4$ type, (and optionally halides, especially alkaline-earth metal chlorides, in the case of mixed silicates comprising some), the heat needed for this conversion being supplied, at least partly, by one or more submerged burners.

In the framework of the invention, part or all of the halide may be substituted by sulfates or even by nitrate, as a source of alkaline/alkaline-earth or earth metals. It may be notably sodium sulfate $Na_2SO_4$. So, those different starting materials (solides, nitrates, sulfates) are, in the invention, to be considered as equivalent.

The term "silica" should be understood here to mean any compound containing mostly silica (silicon oxide) $SiO_2$, even if it may also contain other elements or other minor compounds, this being most particularly the case when natural materials of the sand type are used.

The expression "submerged burners" should be understood here to mean burners configured so that the "flames" that they generate or the combustion gases resulting from these flames develop within the reactor where the conversion takes place, within the actual mass of the materials undergoing conversion. Generally, they are placed so as to be flush with or project slightly from the side walls or from the sole of the reactor used (we refer here to flames, even if they are not strictly speaking the same "flames" as those produced by overhead burners, for greater simplicity).

The invention thus results in a particularly judicious technological solution in order to be able to exploit on an industrial scale a chemical transformation already proposed by Gay-Lussac and Thénard, namely the direct conversion of NaCl into soda, involving the reaction of NaCl with silica at high temperature in the presence of water according to the following reaction:

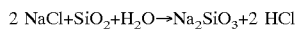
$$2\ NaCl + SiO_2 + H_2O \rightarrow Na_2SiO_3 + 2\ HCl$$

the principle consisting in extracting the soda by forming the silicate, the equilibrium being always shifted in the direction of NaCl decomposition because the two phases are immiscible.

When sodium sulfate is used instead of NaCl, the reaction is the following one:

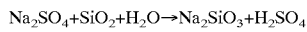
$$Na_2SO_4 + SiO_2 + H_2O \rightarrow Na_2SiO_3 + H_2SO_4$$

In fact, $SO_3$ is firstly formed, and it is then transformed into sulfuric acid because of the heat and of the water produced by the combustion with the submerged burners.

Hitherto, this reaction has caused considerable processing problems associated with difficulties in producing an intimate mixture of the reactants and in ensuring that these are replenished during manufacture, also associated with difficulties in discharging HCl (or $H_2SO_4$) without it reacting again with the silicate formed, in extracting the silicate and in being able to supply sufficient thermal energy.

The use of submerged burners for supplying this thermal energy solves at the same time most of these difficulties.

In fact, it has already been proposed to use heating by submerged burners for melting vitrifiable materials for making glass. For example, reference may be made to U.S. Pat. Nos. 3,627,504, 3,260,587 or 4,539,034. However, the use of such burners in the specific context of the invention, namely the synthesis. of silicates from salts, is extremely advantageous:

this is because this mode of combustion generates water, which water, as was seen above, is indispensable in the desired conversion. By virtue of submerged burners, it is thus possible to manufacture in situ the water needed for the conversion, at least partly (even if, in some cases, it may be necessary to supply additional water). It is also certain that the water is introduced within the other starting substances, namely the silica and the salt(s) (for the sake of brevity, the term "salts" will be used to mean the chloride-type halides of alkali metals, rare earths and, optionally, alkaline-earth metals, used as the starting reactants), this being, of course, propitious to promoting the reaction;

moreover, the combustion produced by submerged burners causes, within the materials undergoing the reaction, strong turbulence and strong convection movements around each "flame" or "flames" and/or each of the jets of gas coming from each of the burners. Consequently, it will therefore ensure, at least partly, vigorous stirring between the reactants, which stirring is needed in order to guarantee intimate mixing between the various reactants, most particularly those introduced in solid (pulverulent) form such as the silica and the salt(s);

submerged burners are also particularly advantageous from the strictly thermal standpoint, since they supply heat directly to the point where it is needed, namely in the mass of the products undergoing the reaction, therefore minimizing any loss of energy, and because they are sufficiently powerful and effective for the reactants to be able to reach the relatively high temperatures needed for their melting/conversion, namely temperatures of at least 1000° C., especially about 1200° C.;

furthermore, they are a mode of heating that is particularly environmentally friendly, by especially reducing as far as possible any emission of $NO_x$-type gases.

It may therefore be concluded that the effectiveness of these burners at every level (quality of the mix, excellent heat transfer and one of the reactants being generated in situ) means that the conversion is highly favoured, this being so without there necessarily being a requirement to achieve extremely high temperatures.

The oxidizer chosen for feeding the submerged burner(s) may simply be air. However, an oxidizer in the form of oxygen-enriched air, and even substantially in the form of oxygen alone, is preferred. A high oxygen concentration is advantageous for various reasons: the volume of flue gases is reduced, this being favourable from an energy standpoint and avoids any risk of excessive fluidization of the materials undergoing the reaction that might cause them to be projected against the superstructures or the roof of the reactor where the conversion takes place. Furthermore, the "flames" obtained are shorter and of higher emissivity, thereby allowing more rapid transfer of their energy to the materials undergoing melting/conversion.

With regard to the choice of fuel for the submerged burner(s), two approaches are possible, which are alternatives or can be combined:

it is possible to choose a liquid fuel, of the fuel oil type, or a gaseous fuel, of the natural gas type (mostly methane), propane or hydrogen;

it is also possible to use a fuel in solid form, containing carbon, for example coal, or any material containing hydrocarbon, optionally chlorinated, polymers.

The choice of oxidizer and the choice of fuel for the submerged burners influence the nature of the products obtained, apart from the silicates. Thus, when the burners are fed with oxygen and with natural gas, schematically the following two reactions occur: (starting from the simplest situation in which it is desired to make the Na silicate from NaCl, but it is possible to transpose it to all other cases, whether of making K silicate, Ce silicate or silicates containing Ca or Mg, etc.):

(a) $2\ NaCl+SiO_2+H_2O \rightarrow Na_2SiO_3+2\ HCl$ (b) $CH_4+2\ O_2 \rightarrow CO_2+2\ H_2O$ These two reactions may be combined into a single reaction:

(c) $4\ NaCl+2\ SiO_2+CH_4+2\ O_2 \rightarrow 2\ Na_2SiO_3+4\ HCl+CO_2$

When hydrogen is used as fuel rather than natural gas, there is no longer any emission of $CO_2$ and the overall reaction may be written as:

(d) $4\ NaCl+2\ SiO_2+2\ H_2+O_2 \rightarrow 2\ Na_2SiO_3+4\ HCl$

When a carbon-containing solid-type fuel is used, always with an oxygen-type oxidizer, the following reaction may be written:

(e) $2\ NaCl+3/2\ O_2+C+SiO_2 \rightarrow Na_2SiO_3+Cl_2+CO_2$.

This time, what is produced is therefore no longer HCl but chlorine $Cl_2$ as by-products of the conversion.

It is therefore clear from these various reactions-balances that the conversion envisaged by the invention also generates halogen-containing derivatives most particularly utilizable chlorine-containing derivatives such as HCl or $Cl_2$(or $H_2SO_4$), which are found in the flue gases. Two ways of operation are possible:

one consists in retreating them as effluents. Thus, it is possible to neutralize HCl with calcium carbonate $CaCO_3$, which amounts to manufacturing $CaCl_2$, which is possibly utilizable (for example, for removing snow from roads);

the other way consists in considering the conversion according to the invention as a means of manufacturing HCl or $Cl_2$ on an industrial scale, these being base chemicals widely used in the chemical industry. (It is possible, especially, for the chlorine obtained electrolytically, which is necessary for the manufacture of chlorinated polymers of the PVC or polyvinyl chloride type to be substituted with the HCl or the $Cl_2$ manufactured according to the invention). In this case, it would then be necessary to extract them from the flue gases and thus establish an industrial production line for HCl or $Cl_2$, for example by incorporating the apparatus for carrying out the process according to the invention directly in a chemical industry site needing these types of chlorinated product. Thus, utilizing the chlorinated derivatives formed makes it possible to further lower the cost of the batch materials containing alkali metals necessary for the manufacture of glass.

A first outlet for the silicates manufactured according to the invention relates to the glassmaking industry: they may replace, at least partly, the conventional batch materials which provide alkali metals or rare earths, most particularly with regard to sodium by at east partially substituting $CaCO_3$ with $Na_2SiO_3$. The silicates of the invention may therefore be used to feed a glass furnace, this being done especially in two different ways:

the first way consists in treating the silicates formed in order to make them compatible with use as vitrifiable batch materials for glass furnaces: this therefore involves extracting them from the reactor and generally converting them "cold" into a pulverulent solid phase, especially through a granulation step using techniques known in the glassmaking industry. There is therefore a complete separation between the silicate manufacturing process and the glass manufacturing process, with suitable forming, and possible storage/transportation, of the silicate formed, before it is fed into the glass furnace;

the second way consists in using the silicate(s) formed according to the invention "hot", that is to say in using a glass manufacturing process which incorporates a prior step of manufacturing the silicate which is to be fed, while still molten, into the glass furnace. Thus, the silicate can be manufactured in a reactor connected to the glass furnace, constituting one of its "upstream" compartments, as opposed to its possible "downstream" compartments intended for the refining/conditioning of the glass once melted.

In both these situations, the glass furnace may be of conventional design (for example, an electric melting furnace using submerged electrodes, a crown-fired furnace operating with lateral regenerators, an end-fired furnace, or any type of furnace known in the glassmaking industry, thus including furnaces with submerged burners), optionally with a design and a mode of operation which are slightly modified so as to be suitable for a melting process involving no carbonate or with less carbonate than in the case of standard melting processes.

It should be noted that certain silicates other than sodium silicate are also highly advantageous to manufacture according to the invention. Thus, the invention makes it possible to manufacture potassium silicate from KCl, this being, at least economically, highly advantageous as a batch material containing Si and K for manufacturing glasses called "mixed alkali" glasses, that is to say those containing both Na and K. These glasses are especially used for making touch screens, glasses for television screens, lead glasses, and glasses for plasma display panels.

Likewise, the invention allows more economical manufacture of special glasses containing additives for which chlorides are less expensive than oxides. This is the case of rare earths such as cerium, the presence of cerium oxide giving the glasses UV screening properties, and rare earths of this type are also included in the composition of special glasses having a high elastic modulus for hard disks. The invention thus makes it possible to have a batch material containing Si and Ce -cerium silicate-, for a moderate cost.

Another additional advantage of the invention is that the silica introduced at the start undergoes, during conversion into silicate, a certain de-ironing, since iron chloride is volatile: the glass produced from this silicate, by using at least a certain amount of this silicate, will therefore tend to be clearer than a glass using none of this type of silicate at all. This is advantageous from an aesthetic standpoint and tends to increase the solar factor of the glass (in a "flat glass" application).

A second outlet for the silicates manufactured according to the invention, (apart from those used as batch materials for glass furnaces), more particularly sodium silicate, is in the detergents industry, sodium silicate $Na_2SiO_3$ frequently being used in the washing powder/detergent compositions.

A third outlet for the silicates (and optionally the chlorinated derivatives) formed according to the invention is in the preparation of special silicas, commonly called "precipitated silicas" used, for example, in the composition of concretes. The silicates formed according to the invention may in fact be subjected to acid attack, advantageously by hydrochloric acid HCl which has also been formed by the conversion according to the invention, go as to precipitate silica in the form of particles having a particular particle size: the intended particle size is generally of the order of a nanometre (1 to 100 nm, for example).

The sodium chloride also formed during the precipitation of the silica may advantageously be recycled, again serving most particularly as raw material for the silicate manufacture according to the invention. This is an extension of the invention in which, starting from a particulate silica of "coarse" particle size (of about 1 micron or coarser, for example), a particulate silica is again obtained, but the particle size is much less, this control and this particle size opening the way to a very wide variety of uses in materials used in industry.

For this third outlet more particularly, it is interesting to choose an alkaline sulfate rather than a chloride: we obtains $H_2SO_4$, rather than HCl, which serves to the acid attack of the sodium silicate formed. It is this kind of acid which is used in the chemical industry to prepare precipitated silicas. It is more advantageous than HCl in this particular cas, because it avoids any presence of residual chlorides in the silica, which are potentially a source of corrosion for this product.

A process for producing precipitated silicas according to the invention can present the following steps, schematically:

reaction in a furnace equipped with submerged burners (notably oxy-gas or oxy-hydrogen ones), between a silica sand of the appropriate purity and sodium sulfate, with an amount of water to add in a controlled way depending on the amount of water generated by the combustion. Sodium silicate is thus formed according to the above-mentioned reaction. It is evacuated continuously, the $SO_3$ formed is transformed into $H_2SO_4$, which is recuperated downstream, sodium sulfate silicate produced with the appropriate $SiO_2/Na_2O$ modulus is then attacked by the recuperated $H_2SO_4$. Silica precipitates, and is treated so as to confer to it the appropriate properties according to its uses 'additives for rubber, . . . )

during this reaction, sodium sulfate is again formed, which can be concentrated and recycled in the furnace equipped with submerged burners as a source of sodium.

It can be seen that this process works continuously, in a "closed loop" as far as the acid and the source of sodium are concerned. It makes it possible to modify the granulometry of the silica, consuming only sand and energy. Heat from the exhaust fumes and from the condensation of SO; can be recuperated so as to produce, for example, the vapor necessary to concentrate the aqueous solutions.

This kind of process applies in a very similar way when using another alkaline than sodium or another . . . like a sulfate, or any other element the sulfate of which is thermally stable and can indigo the same kind of reaction.

Another advantageous application of the process relates to the treatment of chlorine-containing waste, most particularly chlorine-containing and carbon-containing waste such as chlorinated polymers (PVC, etc.); the melting by submerged burners, according to the invention, can pyrolyse this waste with, as ultimate combustion products, $CO_2$ and HCl, the HCl possibly being, as seen previously, neutralized or utilized as it is. It may also be noted that such waste can therefore also serve as carbon-containing solid fuel, which in fact can allow the amount of fuel to be injected into the burners to be decreased. (Other types of waste, such a foundry sand, may be involved). The pyrolysis of these various types of waste is here again advantageous from an economic standpoint since their cost of treatment, which is moreover necessary, is deducted from the cost of producing the silicates according to the invention. Rather than actually pyrolysing the waste, it may also be vitrified.

Those waste containing both chlorine and organic materials can be rendered inert in a chemical point of view according to the process of the invention. To the sand and the chloride (or its equivalent) can be added solid or liquid wastes. Same additives can also be added, like CaO, alumina, or other oxides. So, it is a real vitrification, the vitrified material obtained are capable of stabilizing the possible mineral materials contained in those waste. The acid produced can be recuperated in an absorption tome which filters the fumes, and can be recycled. This process is very advantageous in an economical point of view. In the one hand, the major fusing component used is brought by the salt, and at least part of the energy necessary for the vitrification is brought by the wastes themselves. In the other hand, it makes it possible to recycle the acid which is formed.

Different kinds of combustible wastes can be mixed. For this application, it is more appropriate to make a silicate rich in alkaline-earth metals, or even only made of alkaline-earth silicate: the aim being to render waste inert, and not to make a high quality glass, it is advantageous to use mostly alkaline-earth silicates because the raw material carrying these alkaline-earth metals is less expansive than the one carrying alkali metals.

The subject of the invention is also the apparatus for carrying out the process according to the invention, which apparatus preferably comprises a reactor equipped with one or more submerged burners and with at least one means for introducing silica and/or halides (or equivalents like sulfates or nitrates) below the level of the molten materials, especially in the form of one or more feed-screw batch chargers. Preferentially, the solid or liquid combustibles like the above-mentioned wastes can be introduced in the furnace the same way. It is thus possible to introduce directly into the mass of products undergoing melting/reaction at least those of the starting reactants capable of vapourizing before having the time to react: one thinks here most particularly of sodium chloride NaCl. One ensures this way a sufficient time of sejourn of the liquid or solid combustibles so as to achieve their complete combustion.

Preferably, the walls of the reactor, especially those intended for being in contact with the various reactants/reaction products involved in the conversion, are provided with refractory materials lined with a metal lining. The metal must be able to withstand the various types of corrosive attack, especially here that caused by HCl. Titanium, a metal from the same family, or an alloy containing titanium are preferred. Advantageously, provision may be made for all the elements inside the reactor, emerging in the latter, to be based on this type of metal or to be protected on the surface by a coating of this metal (the batch chargers and submerged burners). It is preferable for the walls of the reactor, and also especially all the metal parts inside the latter, to be associated with a fluid-circulation cooling system of the water-box type. The walls may also be entirely made of metal, with no or very few standard refractories used for the construction of glass furnaces.

The walls of the reactor define, for example, an approximately cubic, parallelepipedal or cylindrical cavity (having a square, rectangular or round base). Advantageously, several points of introducing the starting reactants may be provided, for example distributed in a regular manner in the side, walls of the reactor, especially in the form of a certain number of batch chargers. This multiplicity of supply points allows the amount of reactants in each of them to be limited and a more homogeneous mixture in the reactor to be obtained.

The reactor according to the invention may also be equipped with various means for treating the chlorinated effluents, especially for recovering or neutralizing effluents of the $Cl_2$ or HCl, or $h_2SO_4$ type, and/or with means for separating the solid particles, especially those based on metal chlorides, from the gaseous effluents. These means are advantageously placed in the flue(s) which extract the flue gases from the reactor.

Finally, the subject of the invention is also a process for producing glass containing silica and alkali-metal oxides of the $Na_2O$ or $K_2O$ type, or rare-earth oxides of the $CeO_2$ type, by melting vitrifiable materials in which the heat needed for the said melting comes at least partly from submerged burners. In this case, the invention resides in the fact that the batch materials containing alkali metals of the Na or K type, or rare earths of the Ce type, are at least partly in the form of halides, especially chlorides, of the said elements, such as NaCl, KCl or $CeCl_4$. This is the second major aspect of the invention in which, as it were, everything takes place as if the silicate, described previously as "in situ", were manufactured during the actual process of melting the vitrifiable materials in order to produce glass. The economic advantage of replacing all or part, especially, of the sodium carbonate with NaCl is clear. In this case, there are the same advantages as those mentioned above, relating to silicate manufacture independently of glass manufacture, namely especially the lesser iron content in the glass, possible utilization of the chlorinated (halogenated) derivatives produced, pyrolysis or vitrification of waste, the latter being, moreover, possibly suitable to act as solid fuel, etc.

The invention will be explained in detail with the aid of an embodiment illustrated by the following figure:

FIG. 1: a schematic plant for manufacturing sodium silicate according to the invention.

This figure is not necessarily to scale and has been extremely simplified for the sake of clarity.

It shows a reactor 1 comprising a sole 2 of rectangular shape which is pierced regularly so as to be equipped with rows of burners 3 which pass through it and penetrate slightly into the reactor. The burners are preferably covered with titanium and are cooled with water. The side walls are also cooled with water and comprise a coating of electrocast refractories 5 or are made entirely of titanium-based metal. The level 5 of materials undergoing reaction/melting is such that the feed-screw batch chargers 6 introduce the reactants through the side wall below this level.

The sole comprising the burners may have a greater thickness of electrocast refractories than the side walls. It is also pierced with a tap hole 10 for extracting the silicate.

The roof 8 may be a suspended flat roof made of refractory materials of the mullite or zirconia-mullite or AZS (aluminium-zirconia-silica) type or of any ceramic material resistant to HCl and/or NaCl. It is designed to be impermeable to the flue gases containing HCl: a non-limiting solution for guaranteeing this impermeability consists in using a honeycomb ceramic structure consisting of hollow hexagonal pieces in which an insulation is placed. Impermeability is therefore achieved between the pieces on the back surface by an HCl-resistant low-temperature mastic. It thus protects the metal supporting structure. The flue 9 is also constructed from HCl- and NaCl-resistant materials (oxide refractories, silicon carbide, graphite). It is provided with a system for separating the solid particles which are liable to condense (metal chlorides) and with an HCl recovery tower, these not being illustrated.

Once the silicate has been extracted from the reactor via the tap hole 10, it is conveyed to a granulator (not illustrated)

of the type used in the glassmaking industry or in the sodium silicate. detergents industry.

The object of the process is to manufacture a silicate which is highly concentrated in terms of sodium, this being quantified in a known manner by a molar ratio of $Na_2O$ with respect to the total ($SiO_2+Na_2O$) in the region of 50%, by introducing into the reactor, via the batch chargers, a mixture of sand (silica) and NaCl. These two reactants may also be introduced separately and may have been optionally preheated before they are introduced into the reactor.

Preferably, the burners 3 are fed with oxygen and with natural gas or hydrogen.

The viscosity of the batch during melting/reaction and the high reaction rate obtained by virtue of submerged-burner technology make it possible to achieve high specific draws—to give an order of magnitude of, for example, at least 10 tonnes/day.

In conclusion, the process of the invention opens up a new way of manufacturing silicates, most particularly sodium, potassium and cerium silicates, for a moderate cost. It also falls within tne context of the present invention of using mutadis mutandi the same process for manufacturing not only alkali-metal silicates or rare-earth silicates but also titanates, zirconates and aluminates of these elements (optionally mixed with silicates).

Thus, a metal may at least partially substitute for silicon, especially a metal belonging to the transition metals and more particularly to those of column IVB of the Periodic Table, such as Ti or Zr, or to the metals of column IIIA of the Periodic Table, such as Al. The advantage of such a substitution is that the product obtained is soluble in water. The selective attack of these products in aqueous solution, especially by using hydrochloric acid formed during the conversion, results in the precipitation of particles no longer of silica, as mentioned earlier in the text, but of corresponding metal oxide particles such as $TiO_2$, $ZrO_2$ and $Al_2O_3$, which particles are generally nanometric in size, as when starting with silica, and which may have numerous applications in industry. It is thus possible to use them as fillers in polymers and concretes, and to incorporate them into ceramic or glass-ceramic materials. It is also possible to exploit their photocatalytic properties: particularly intended are $TiO_2$ particles (which may be incorporated into photocatalytic coatings having antisoiling properties for any architectural material, glazing, etc.).

In order to manufacture these titanates, zirconates, or aluminates according to the invention, the process described earlier for obtaining silicates is transposed, starting from halides of the NaCl type and from metal oxides of the metals involved ($TiO_2$, $ZrO_2$, $Al_2O_3$, etc.).

Alternatively, it is possible to use directly, as metal-containing starting product for the conversion, the halide of the said metal and no longer its oxide. This may especially be a chloride, such as $TiCl_4$, $ZrCl_4$ or $AlCl_3$ (it is also possible to choose as metal-containing starting products a mixture of an oxide and a chloride of the said metal). In this case, the material containing alkali metals may be the same NaCl-type halide used for making silicate, this salt possibly being supplemented with or replaced by soda when it is sodium alkali metal which is involved.

Just as in the case of "precipitated silica", this extension of the process according to the invention may thus be seen as a means of modifying, especially reducing, the size of the particles of a metal oxide so as to provide it with other applications in industrial materials.

It is to be noted also that the invention makes it possible to recycle wastes. It can be used, notably, to clean/treat sans polluted by oil-spills collecting this polluted sand as a starting material for the silica in the framework of this invention brings two major advantages:

first, the sand comes along with the organic, combustible waste (fuel, hydrocarbonate compounds), second, it is a simple way out to clear coasts and beaches of this polluted sand when any other method to clean it is too long or too expansive. The process according to the invention thus allows to totally eliminate fuel. It is advantageous, for this type of application, to make alkaline-earth silicates or silicates mostly comprising alkaline-earth metals like for the application for rendering chlorine/organic waste inert mentionned above, it is economically more interesting to use raw materials carrying alkaline-earth metals than raw materials carrying alkali metals.

What is claimed is:

1. A process for producing at least one alkali metal, alkaline-earth metal, or rare earth metal silicate, or a mixed silicate thereof, comprising, reacting silica and at least one alkali metal, alkaline-earth metal, or rare earth metal halide, sulfate or nitrate in a contiguous molten mass in a reactor, and removing said at least one alkali metal, alkaline-earth metal, or rare earth metal silicate, or a mixed silicate thereof, from said reactor in a molten state, wherein beat and turbulence are supplied to said molten mass by combustion from one or more submerged burners.

2. The process according to claim 1, wherein the combustion supplies water to the reactor.

3. The process according to claim 1 wherein the silicate formed is further treated to make it compatible as a batch material for a glass furnace.

4. The process according to claim 1, wherein the silicate formed is fed hot into a glass furnace.

5. The process according to claim 1, comprising reacting silica and sodium sulfate.

6. The process according to claim 1, comprising reacting silica and sodium chloride.

7. The process according to claim 1, comprising reacting silica and KCl.

8. The process according to claim 1, comprising reacting silica and $CeCl_4$.

9. The process according to claim 2, comprising reacting silica and sodium sulfate.

10. The process according to claim 1, wherein the alkali metal is Na or K, the alkaline earth metal is Ca or Mg, and the rare earth metal is Ce.

11. The process according to claim 1, comprising reacting silica and at least one alkali metal, alkaline-earth metal, or rare earth metal halide wherein said halides are chlorides.

12. The process according to claim 1, wherein said silica and the at least one alkali metal, alkaline-earth metal, or rare earth metal halide, sulfate or nitrate are introduced to said reactor below an upper level of the molten mass.

13. The process as claimed in claim 1, wherein said process produces a mixed silicate combining at least one alkali metal and one alkaline-earth metal.

14. The process as claimed in claim 1, wherein said process produces a mixed silicate combining at least one alkali metal and one rare earth metal.

15. The Process according to claim 1, wherein said combustion from one or more submerged burners is provided by combusting a solid fuel comprising carbon.

16. The process according to claim 15, wherein said solid fuel comprising carbon is coal.

17. The Process according to claim 5, wherein said combustion from one or more submerged burners is provided by combusting a solid fuel comprising carbon.

18. The process according to claim 17, wherein said solid fuel comprising carbon is coal.

19. The process according to claim 9, wherein said combustion from one or more submerged burners is provided by combusting a solid fuel comprising carbon.

20. A process for the formation of precipitated silica from silicate, comprising:

forming silicate according to the process of claim 1, and treating the silicate with acid so as to precipitate silica in the form of particles.

21. The process according to claim 20, wherein said acid is HCl.

22. The process according to claim 20, wherein said particles have a particle size of 1–100 nm.

23. The process according to claim 20, wherein said silicate is sodium silicate, and wherein silica is reacted with sodium sulfate in said contiguous molten mass in said reactor.

24. The process according to claim 20, comprising:

reacting silica and sodium sulfate in a contiguous molten mass in said reactor, removing sodium silicate from said reactor in a molten state, and treating the sodium silicate with $H_2SO_4$.

25. The process according to claim 24, wherein said particles have a particle size of 1–100 nm.

26. The process according to claim 20, wherein said combustion from one or more submerged burners is provided by combusting a solid fuel comprising carbon.

27. The process according to claim 24, wherein said combustion from one or more submerged burners is provided by combusting a solid fuel comprising carbon.

28. The process according to claim 20, wherein acid produced during the formation of the silicate is used to treat the silicate so as to precipitate silica in the form of particles.

29. The process according to claim 22, wherein acid produced during the formation of the silicate is used to treat the silicate so as to precipitate silica in the form of particles.

30. The process according to claim 23, wherein acid produced during the formation of the silicate is used to treat the silicate so as to precipitate silica in the form of particles.

31. The process according to claim 24, wherein acid produced during the formation of the silicate is used to treat the silicate so as to precipitate silica in the form of particles.

32. The process according to claim 27, wherein acid produced during the formation of the silicate is used to treat the silicate so as to precipitate silica in the form of particles.

33. The process according to claim 20, wherein said process produces sodium sulfate which is recycled to the formation of said silicate.

34. The process according to claim 23, wherein said process produces sodium sulfate which is recycled to the formation of said silicate.

35. The process according to claim 24, wherein said process produces sodium sulfate which is recycled to the formation of said silicate.

36. The process according to claim 27, wherein said process produces sodium sulfate which is recycled to the formation of said silicate.

37. The process according to claim 1, further comprising melting conditioning step.

38. The process according to claim 5, further comprising melting said silicate in a refining or conditioning step.

39. The process according to claim 17, further comprising melting said silicate in a refining or conditioning step.

\* \* \* \* \*

UNITED STATES PATENT AND TRADEMARK OFFICE
CERTIFICATE OF CORRECTION

PATENT NO. : 6,883,349 B1
DATED : April 26, 2005
INVENTOR(S) : Pierre Jeanvoine

It is certified that error appears in the above-identified patent and that said Letters Patent is hereby corrected as shown below:

Column 1,
Line 14, "cutlet" should read -- cullet --.

Column 6,
Line 46, "SO;" should read -- $SO_3$ --.

Column 7,
Line 63, "side, walls" should read -- side walls --.

Column 9,
Line 21, "tne" should read -- the --.
Line 67, "sans" should read -- sands --.

Column 10,
Line 27, "beat" should read -- heat --.

Column 12,
Line 31, after "melting" insert -- said silicate in a refining or --.

Signed and Sealed this

Sixteenth Day of August, 2005

JON W. DUDAS
*Director of the United States Patent and Trademark Office*